(12) United States Patent
Choi

(10) Patent No.: US 10,999,591 B2
(45) Date of Patent: May 4, 2021

(54) METHOD AND APPARATUS FOR PROCESSING VIDEO SIGNAL THROUGH TARGET AREA MODIFICATION

(71) Applicant: LG ELECTRONICS INC., Seoul (KR)

(72) Inventor: Jangwon Choi, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 16/618,632

(22) PCT Filed: Jan. 3, 2018

(86) PCT No.: PCT/KR2018/006329
§ 371 (c)(1),
(2) Date: Dec. 2, 2019

(87) PCT Pub. No.: WO2018/222020
PCT Pub. Date: Dec. 6, 2018

(65) Prior Publication Data
US 2020/0195952 A1     Jun. 18, 2020

Related U.S. Application Data

(60) Provisional application No. 62/514,014, filed on Jun. 2, 2017.

(51) Int. Cl.
*H04N 19/44*     (2014.01)
*H04N 19/176*     (2014.01)
(Continued)

(52) U.S. Cl.
CPC .......... *H04N 19/45* (2014.11); *H04N 19/147* (2014.11); *H04N 19/172* (2014.11); *H04N 19/176* (2014.11)

(58) Field of Classification Search
CPC ........ H04N 19/14; H04N 19/60; H04N 19/70; H04N 19/176; H04N 19/147; H04N 19/172
See application file for complete search history.

(56) References Cited

U.S. PATENT DOCUMENTS

| 2014/0016698 | A1 | 1/2014 | Joshi et al. | |
|---|---|---|---|---|
| 2014/0192866 | A1* | 7/2014 | Cohen | H04N 19/117 375/240.12 |
| 2015/0078445 | A1* | 3/2015 | Wang | H04N 19/13 375/240.12 |

FOREIGN PATENT DOCUMENTS

| KR | 101221173 B1 | 1/2013 |
|---|---|---|
| KR | 1020150046353 A | 4/2015 |
| KR | 101609468 B1 | 4/2016 |

* cited by examiner

*Primary Examiner* — Tsion B Owens
(74) *Attorney, Agent, or Firm* — Dentons US LLP

(57) ABSTRACT

The present disclosure provides a method for processing a video signal through target modification, the method comprising the steps of: acquiring a target modification flag from a sequence parameter set of the video signal, wherein the target modification flag indicates whether a modification is performed on a target region; if the modification is performed on the target region according to the target modification flag, acquiring a target modification index, wherein the target modification index indicates a target modification scheme which corresponds to a non-modification, a left-right symmetric modification, an up-down symmetric modification, a rotation modification, or a combination thereof; identifying a target modification scheme which corresponds to the target modification index; and performing an inverse-modification on a reconstructed target region, according to the identified target modification scheme.

8 Claims, 12 Drawing Sheets

(51) Int. Cl.
*H04N 19/147* (2014.01)
*H04N 19/172* (2014.01)

[Fig. 1]
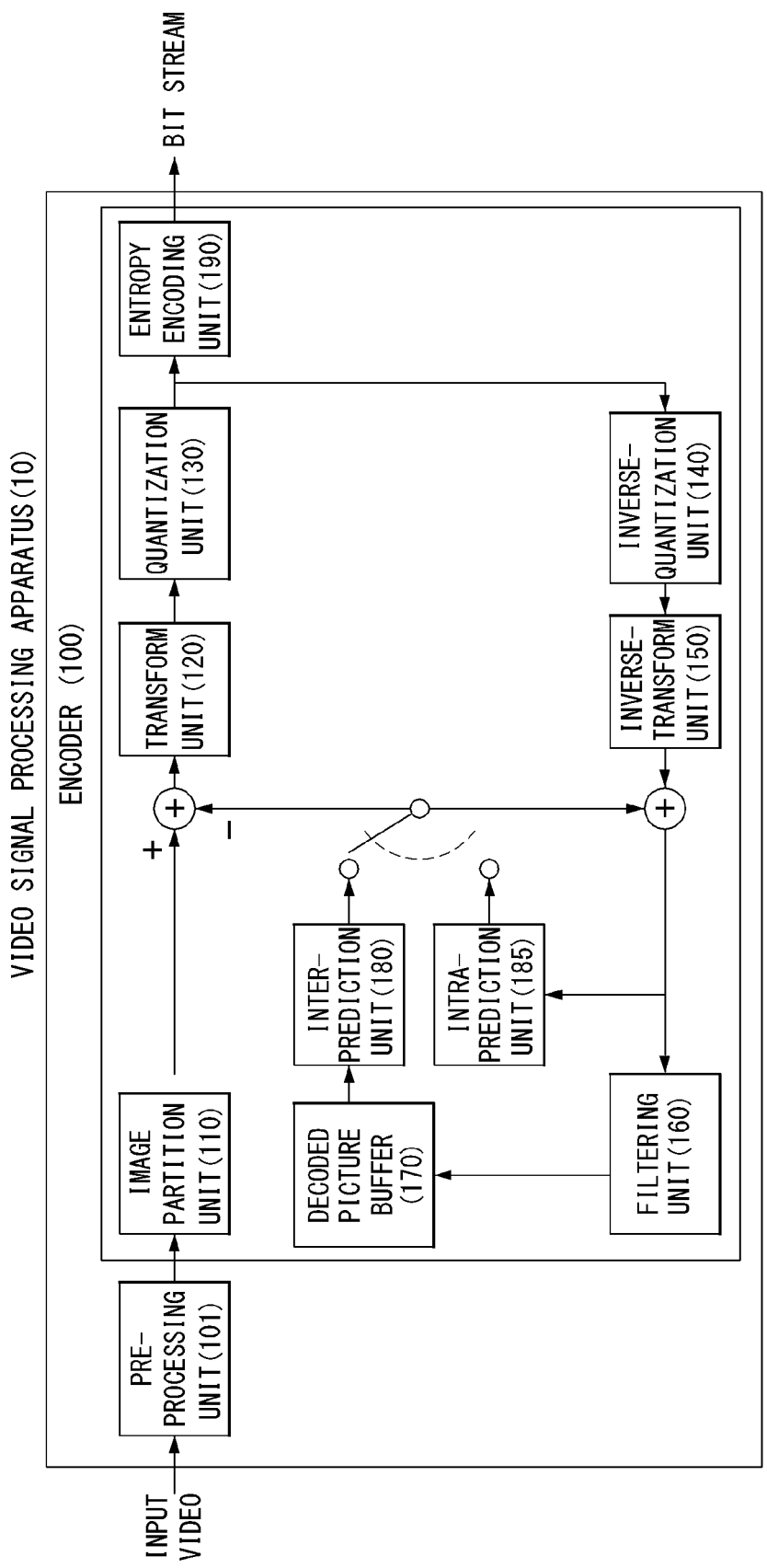

[Fig. 2]
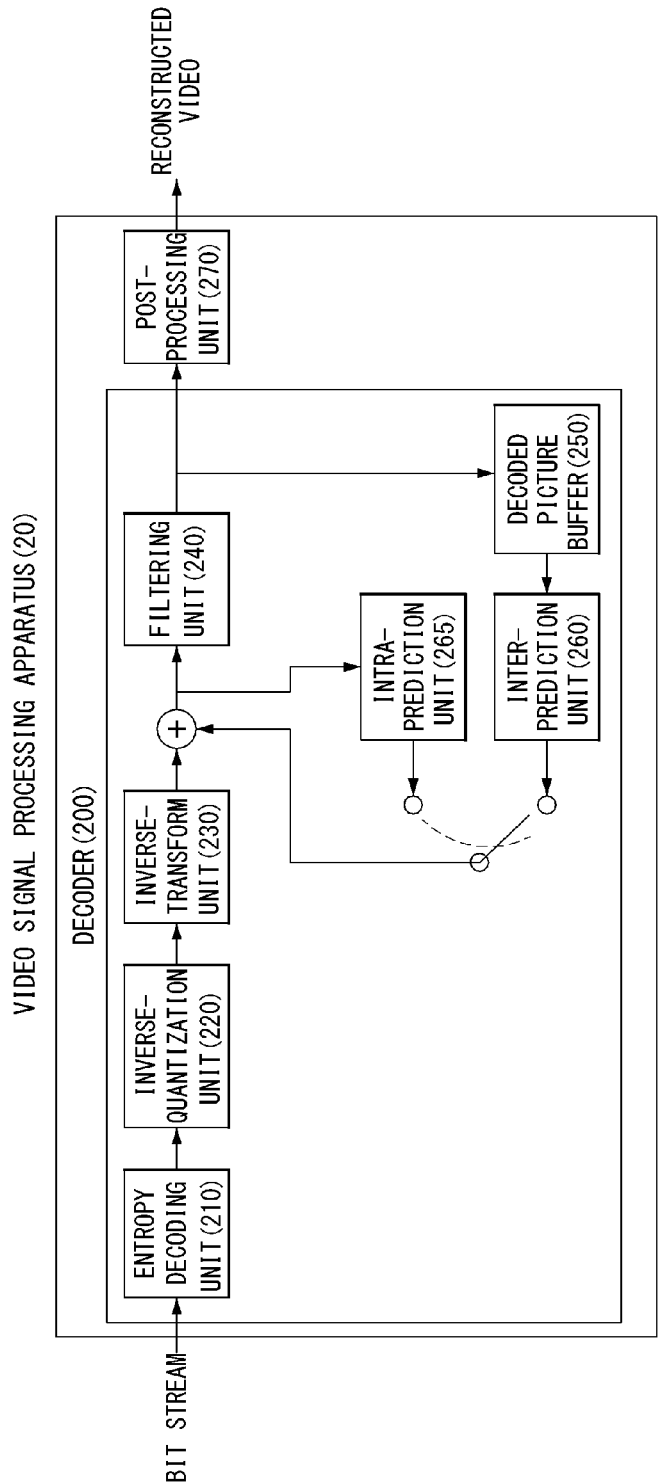

[Fig. 3]
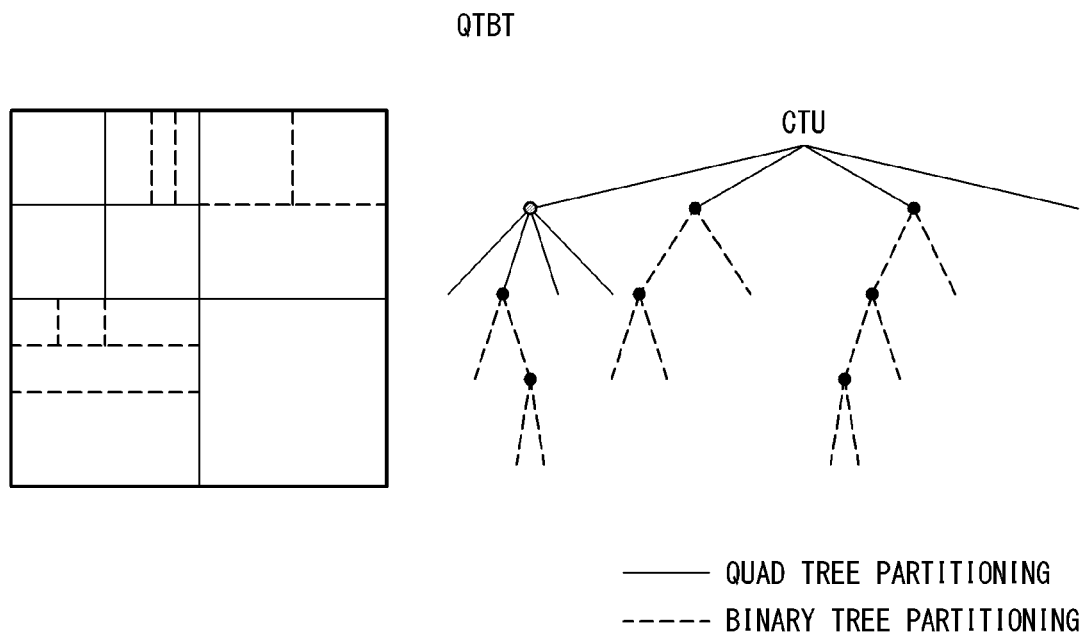

[Fig. 4]
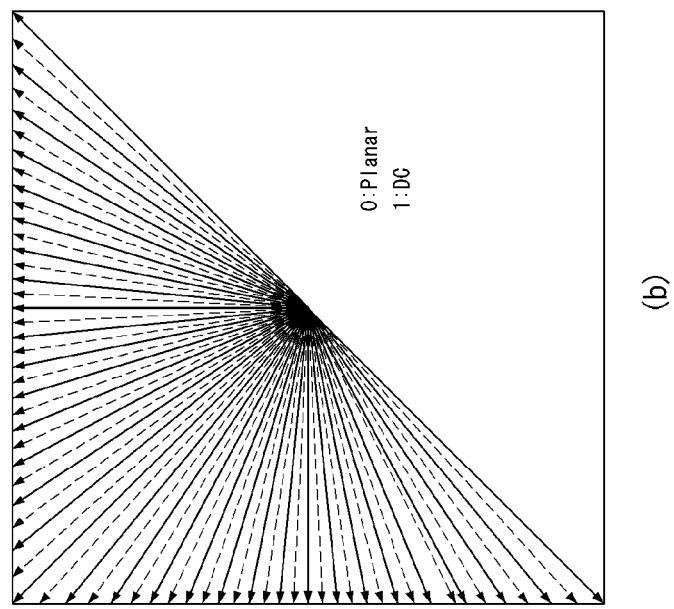
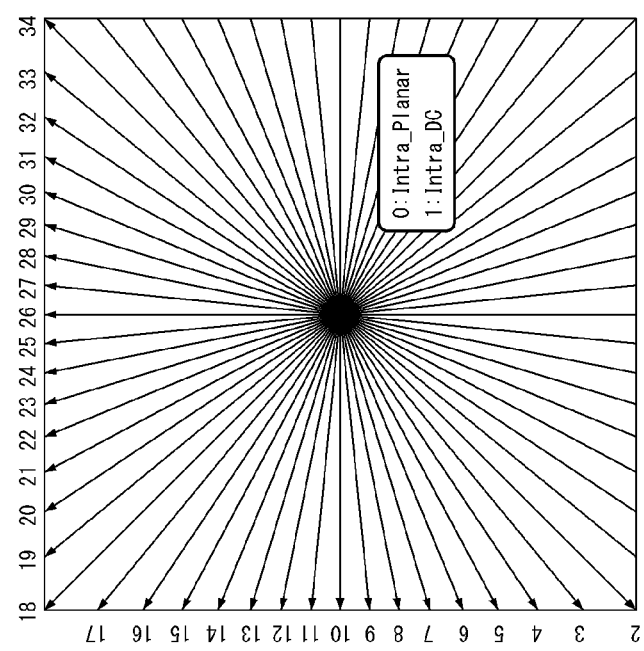

[Fig. 5]
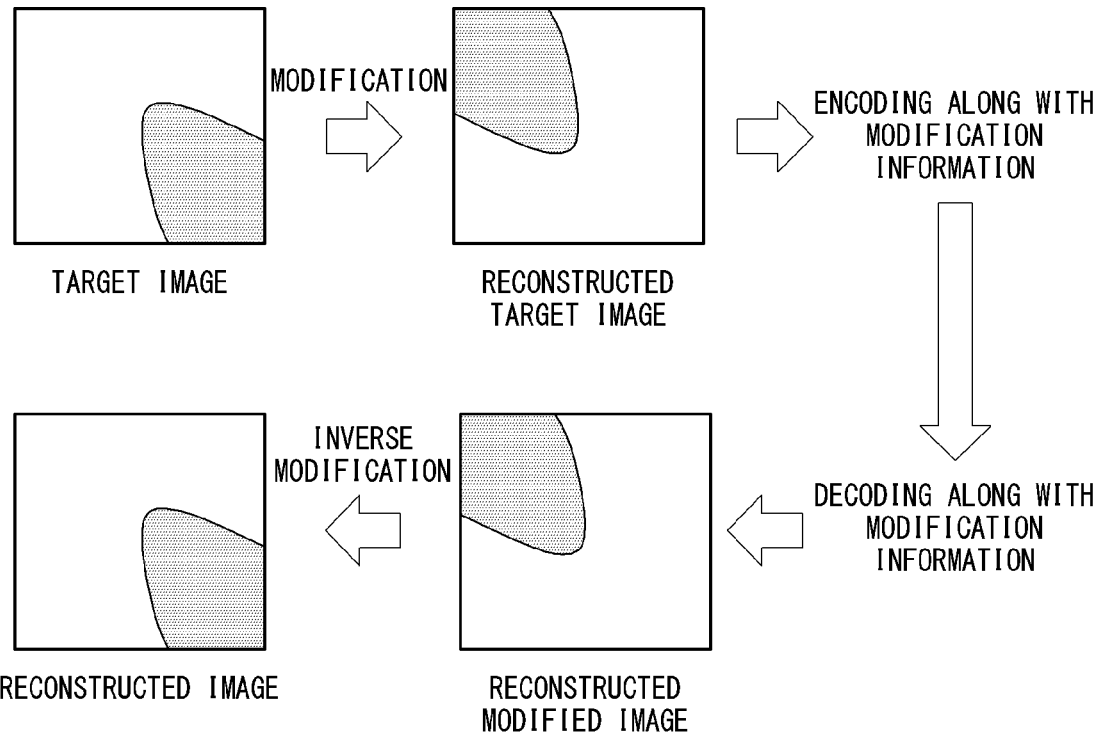
[Fig. 6]
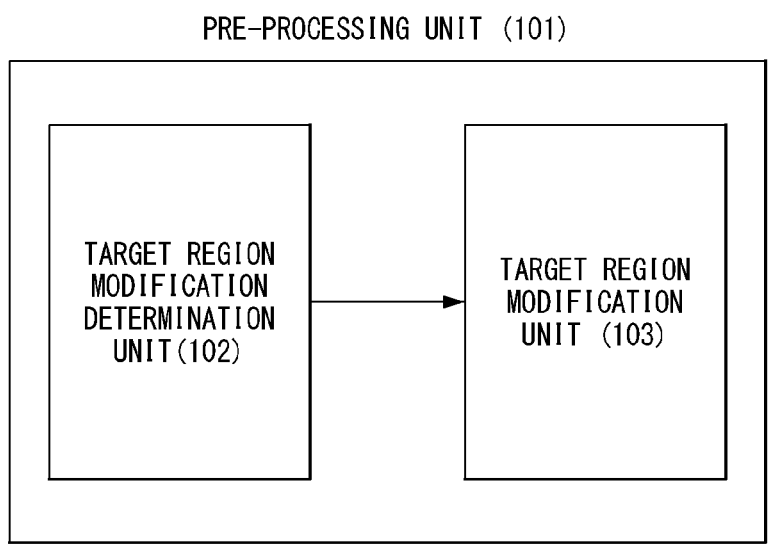

[Fig. 7]
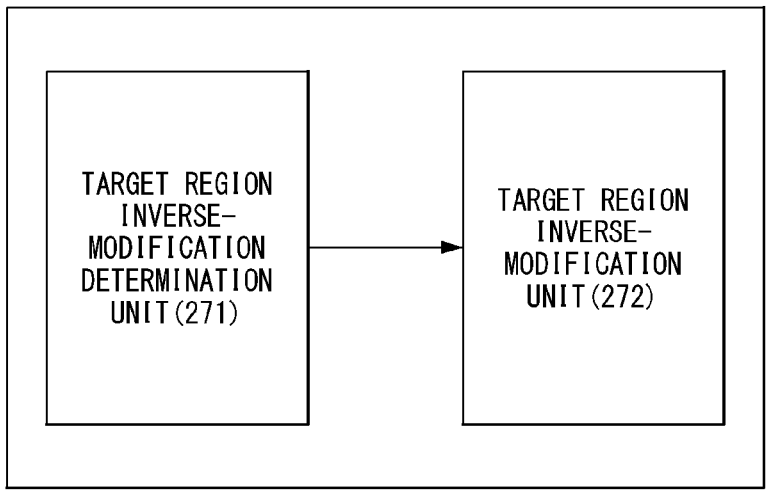
[Fig. 8]
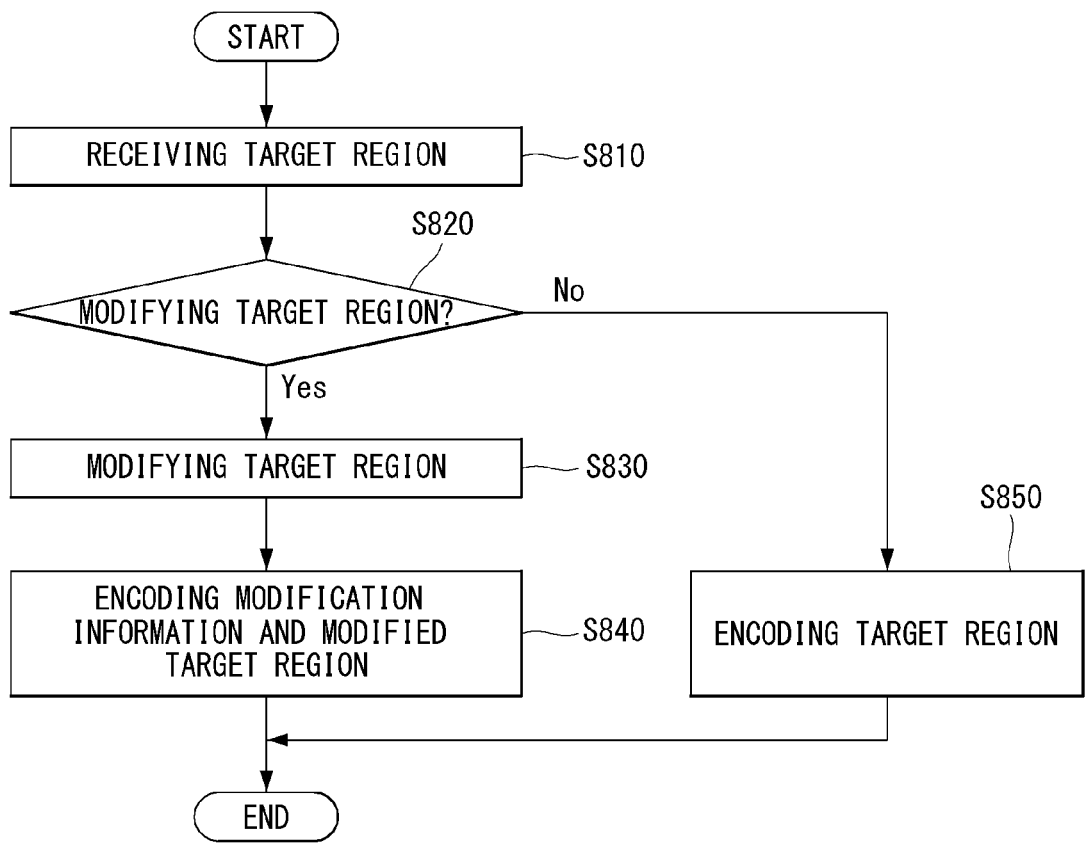

[Fig. 9]
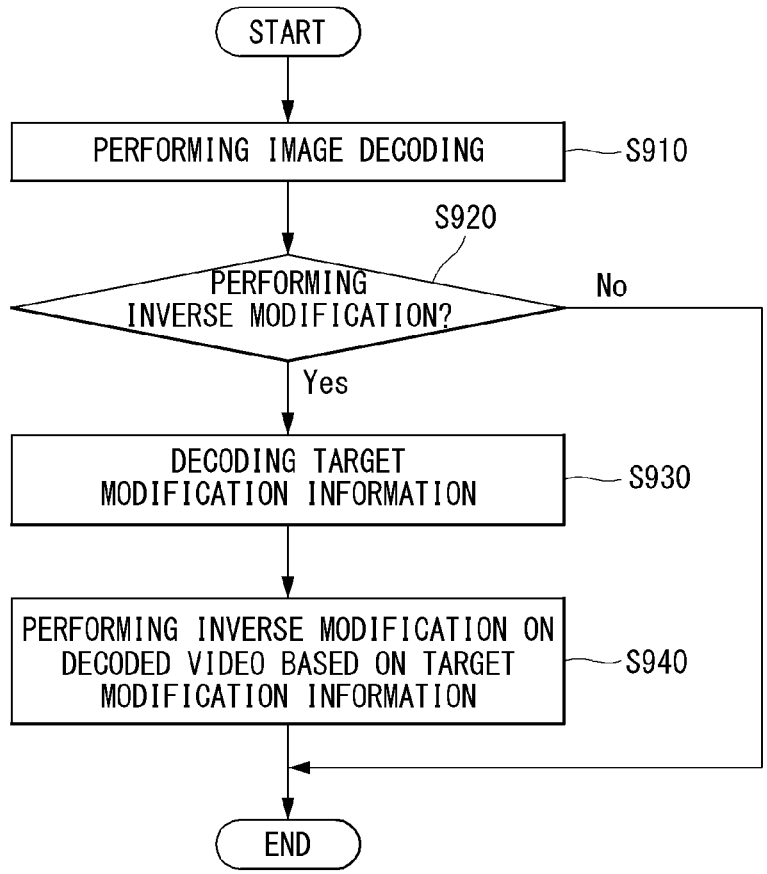
[Fig. 10]
| seq_parameter_set_rbsp( ) { | Descriptor |
|---|---|
| ... | u(1) |
|    pic_width_in_luma_samples | ue(v) |
|    pic_height_in_luma_samples | ue(v) |
| S1010 — sps_seq_transform_id | u(3) |
|    conformance_window_flag | u(1) |
| ... | |

[Fig. 11]

| seq_parameter_set_rbsp( ) { | Descriptor |
|---|---|
| ... | u(1) |
| pic_width_in_luma_samples | ue(v) |
| pic_height_in_luma_samples | ue(v) |
| S1110 — sps_seq_transform_flag | u(1) |
| S1120 — if(sps_seq_transform_flag) | |
| S1130 — sps_seq_transform_id | u(1) |
| conformance_window_flag | u(1) |
| ... | |

[Fig. 12]

| pic_parameter_set_rbsp( ) { | Descriptor |
|---|---|
| pps_pic_parameter_set_id | ue(v) |
| pps_seq_parameter_set_id | ue(v) |
| S1210 — pps_seq_transform_id | u(2) |
| dependent_slice_segments_enabled_flag | u(1) |
| output_flag_present_flag | u(1) |
| ... | u(3) |

[Fig. 13]

| pic_parameter_set_rbsp( ) { | Descriptor |
|---|---|
| pps_pic_parameter_set_id | ue(v) |
| pps_seq_parameter_set_id | ue(v) |
| S1310 — pps_seq_transform_flag | u(1) |
| dependent_slice_segments_enabled_flag | u(1) |
| output_flag_present_flag | u(1) |
| ... | u(3) |

【Fig. 14】

| slice_segment_header ( ) { | Descriptor |
|---|---|
| ... | u(1) |
| slice_pic_parameter_set_id | ue(v) |
| S1410 → slice_seq_transform_id | u(3) |
| if( !first_slice_segment_in_pic_flag ) { | |
| ... | |

【Fig. 15】

| seq_parameter_set_rbsp( ) { | Descriptor |
|---|---|
| ... | u(1) |
| pic_width_in_luma_samples | ue(v) |
| pic_height_in_luma_samples | ue(v) |
| S1510 → seq_transform_flag | u(1) |
| conformance_window_flag | u(1) |
| ... | |

| slice_segment_header ( ) { | Descriptor |
|---|---|
| ... | u(1) |
| slice_pic_parameter_set_id | ue(v) |
| S1520 → if(seq_transform_flag) | |
| S1530 → seq_transform_id | u(1) |
| if( !first_slice_segment_in_pic_flag ) { | |
| ... | |

[Fig. 16]
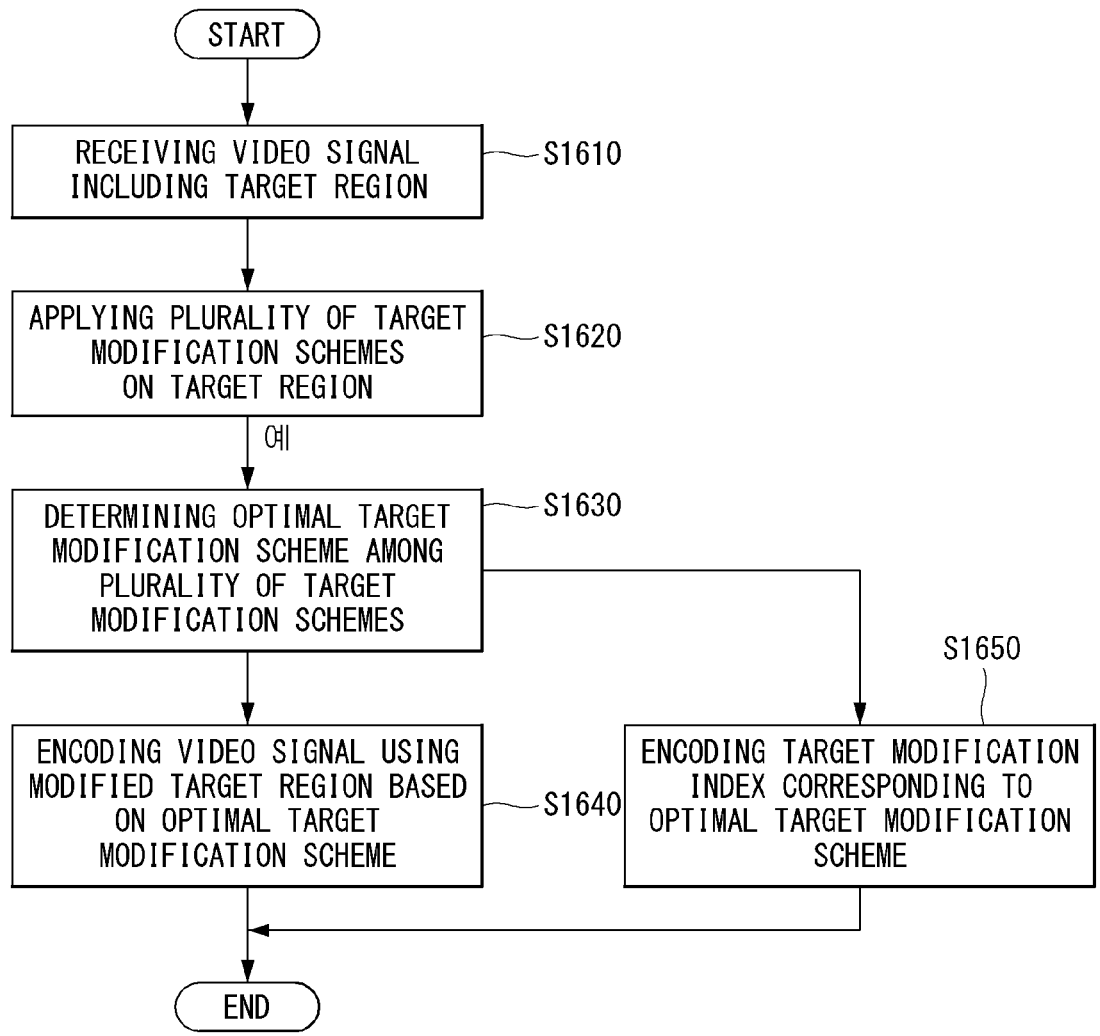

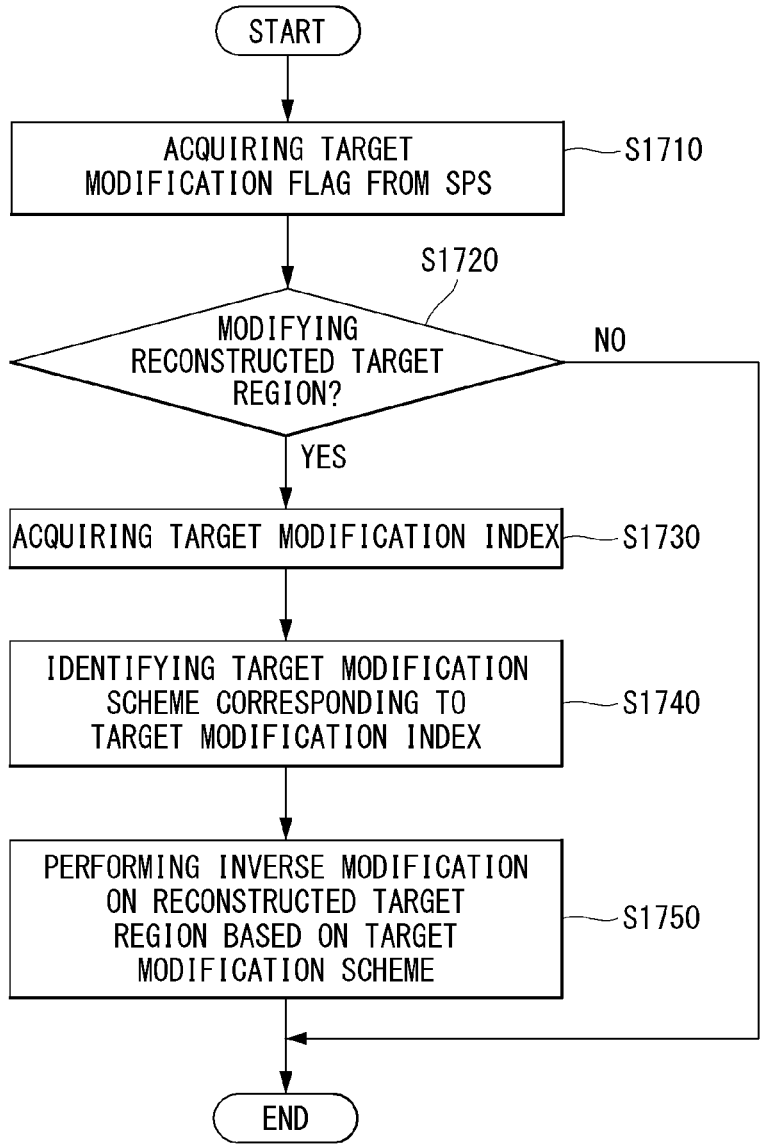
[Fig. 17]

[Fig. 18]
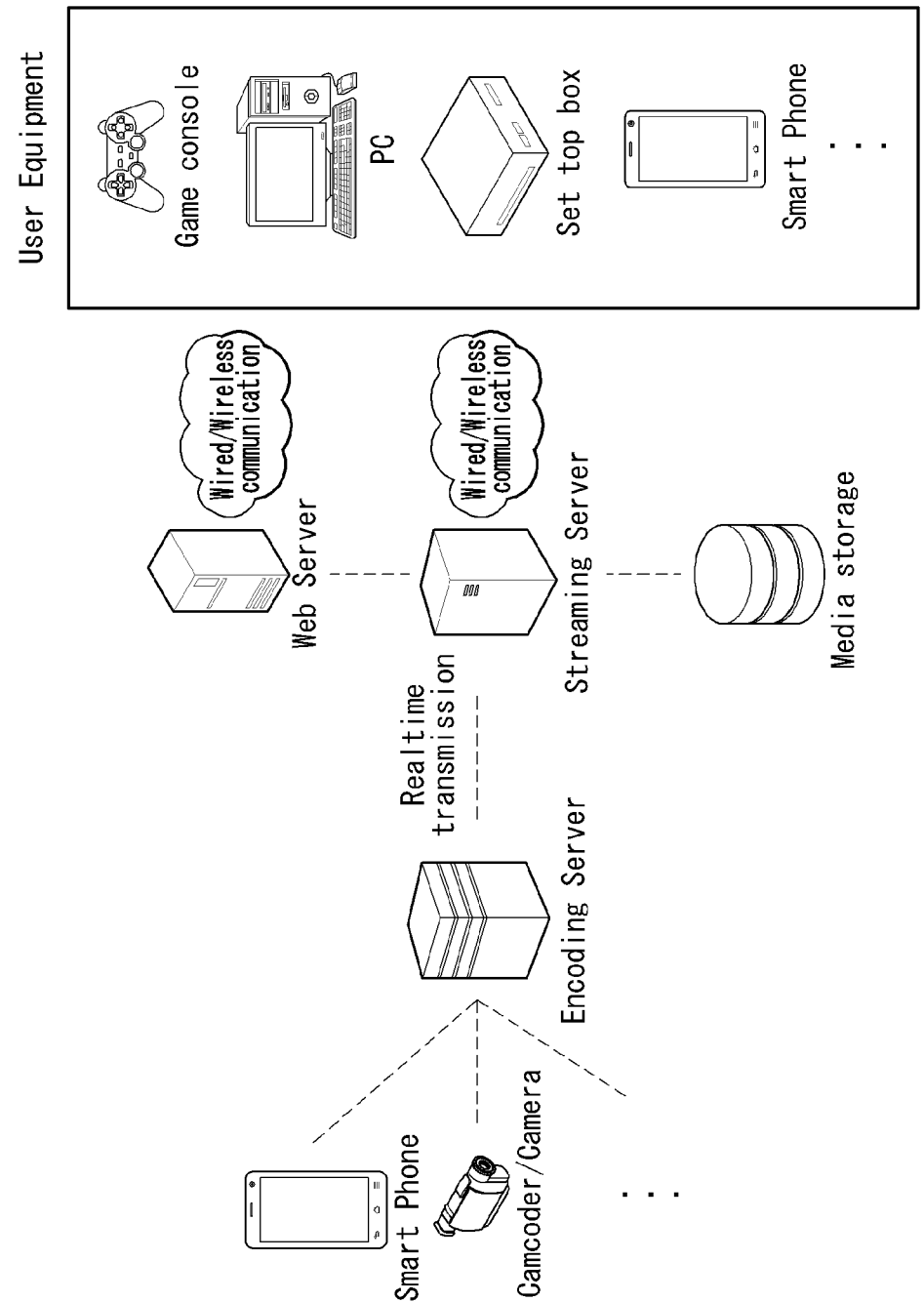

METHOD AND APPARATUS FOR PROCESSING VIDEO SIGNAL THROUGH TARGET AREA MODIFICATION

CROSS-REFERENCE TO RELATED APPLICATIONS

The present application is the National Stage filing under 35 U.S.C. 371 of International Application No. PCT/KR2018/006329, filed on Jan. 3, 2018, which claims the benefit of U.S. Provisional Application No. 62/514,014, filed on Jun. 2, 2017 the contents of which are all hereby incorporated by reference herein in their entirety.

TECHNICAL FIELD

The present disclosure relates to a method of encoding or decoding a still image or a moving picture and, more particularly, an apparatus supporting the same, and provides a method of modifying or transforming a target region in order to enhance coding efficiency in the encoding and decoding process of a video.

BACKGROUND ART

Compression encoding means a series of signal processing technologies for transmitting digitalized information through a communication line or storing digitalized information in a form suitable for a storage medium. Media, such as video, images or voice, may be the subject of compression encoding. Particularly, a technology for performing compression encoding on an image is called video image compression.

Next-generation video content will have characteristics of high spatial resolution, a high frame rate, and high dimensionality of scene representation. In order to process such content, it will lead to a tremendous increase in terms of memory storage, a memory access rate, and processing power.

Accordingly, a new coding tool for more efficiently processing next-generation video content needs to be designed. In particular, in current video coding, a prediction is performed using only pixel information of the left and top of a block upon performing intra prediction because encoding is performed in a block unit from the top left of an image in a raster scan order. Accordingly, there is a problem in that prediction efficiency is reduced if important pixel information, such as an edge, is much in the right or bottom of a block.

DISCLOSURE

Technical Problem

The present disclosure proposes a method of efficiently modifying or transforming a target region for coding compression ratio improvement.

The present disclosure proposes the structure of a video signal processing apparatus capable of modifying or transforming a target region.

The present disclosure proposes a method of enhancing coding efficiency through a new coding tool design.

The present disclosure proposes a method of adaptively modifying or transforming a target region based on a video characteristic.

Technical Solution

The present disclosure provides a method of obtaining higher compression efficiency by applying a left-right and/or up-down symmetric transform, a rotation transform to a target region.

The present disclosure provides a method of signaling modification information or transform information of a target region.

The present disclosure provides a method of selecting an optimal modification scheme through rate-distribution optimization with respect to a plurality of modification or transform methods.

The present disclosure provides a method of selecting an optimal modification scheme through edge distribution analysis.

The present disclosure provides a method of improving coding efficiency by locating important pixel information of an image at the left and top through the modification and modification information transmission of a target region.

Advantageous Effects

The present disclosure can obtain higher compression efficiency by applying the left-right and/or up-down symmetric transform and a rotation transform of a target region. Specifically, the present disclosure can enhance coding efficiency by locating important pixel information of an image at the left and top through the modification and modification information transmission of a target region.

Furthermore, the present disclosure can reconstruct the original image prior to a modification by signaling modification information or transform information of a target region.

DESCRIPTION OF DRAWINGS

FIG. 1 is a schematic block diagram of a video signal processing apparatus including an encoder, which is an embodiment to which the present disclosure is applied.

FIG. 2 is a schematic block diagram of a video signal processing apparatus including a decoder, which is an embodiment to which the present disclosure is applied.

FIG. 3 is a diagram for describing a division structure of a coding unit, which is an embodiment to which the present disclosure is applied.

FIG. 4 is a diagram for describing prediction directions according to intra prediction modes, which is an embodiment to which the present disclosure is applied.

FIG. 5 is a diagram for describing a process of processing a video signal through the modification of a target region, which is an embodiment to which the present disclosure is applied.

FIG. 6 is a schematic block diagram of a pre-processing unit for modifying a target region, which is an embodiment to which the present disclosure is applied.

FIG. 7 is a schematic block diagram of a post-processing unit for performing an inverse modification on a target region, which is an embodiment to which the present disclosure is applied.

FIG. 8 is a flowchart illustrating a process of processing a video signal through the modification of a target region, which is an embodiment to which the present disclosure is applied.

FIG. 9 is a flowchart illustrating a process of processing a video signal through an inverse modification of a target region, which is an embodiment to which the present disclosure is applied.

FIG. 10 shows a syntax structure that defines modification information (sps_seq_transform_id) in a sequence parameter set (SPS) level, which is an embodiment to which the present disclosure is applied.

FIG. 11 shows a syntax structure that defines modification information in a sequence parameter set (SPS) level, which is an embodiment to which the present disclosure is applied.

FIG. 12 shows a syntax structure that defines modification information (sps_seq_transform_flag and sps_seq_transform_id) in a sequence parameter set (SPS) level, which is an embodiment to which the present disclosure is applied.

FIG. 13 shows a syntax structure that defines modification information (pps_seq_transform_id) in a picture parameter set (PPS) level, which is an embodiment to which the present disclosure is applied.

FIG. 14 shows a syntax structure that defines modification information (slice_seq_transform_id) in a slice header, which is an embodiment to which the present disclosure is applied.

FIG. 15 shows a syntax structure that defines modification information (sps_seq_transform_flag and sps_seq_transform_id) in a sequence parameter set (SPS) and slice header, which is an embodiment to which the present disclosure is applied.

FIG. 16 is a flowchart for describing a process of modifying a target region, which is an embodiment to which the present disclosure is applied.

FIG. 17 is a flowchart for describing a process of performing an inverse modification on a target region, which is an embodiment to which the present disclosure is applied.

FIG. 18 shows the structure of a content streaming system, which is an embodiment to which the present disclosure is applied.

BEST MODE

The present disclosure provides a method for processing a video signal through a target modification. The method includes acquiring a target modification flag from a sequence parameter set of the video signal, wherein the target modification flag indicates whether a modification is performed on a target region, if the modification is performed on the target region according to the target modification flag, acquiring a target modification index, wherein the target modification index indicates a target modification scheme which corresponds to a non-modification, a left-right symmetric modification, an up-down symmetric modification, a rotation modification, or a combination thereof, identifying a target modification scheme which corresponds to the target modification index, and performing an inverse-modification on a reconstructed target region, according to the identified target modification scheme.

In the present disclosure, the target modification scheme which corresponds to the target modification index is determined based on an edge distribution, complexity, or rate-distortion cost of the target region.

In the present disclosure, in case of the edge distribution of the target region, when a vertical diagonal edge in the target region is distributed more than or equal to a predetermined threshold value, the target modification scheme corresponds to the left-right symmetric modification or the up-down symmetric modification.

In the present disclosure, in case of the complexity of the target region, when a complexity of a right-side area of the target region is a higher than a left-side area of the target region, the target modification scheme corresponds to the left-right symmetric modification.

In the present disclosure, the target region corresponds to at least one of a sequence, an image, a frame, a tile, or a block.

In the present disclosure, the target modification index is acquired from the sequence parameter set, a picture parameter set, or a slice header.

The present disclosure provides a method for processing a video signal through a target modification. The method includes receiving the video signal including a target region, applying a plurality of target modification schemes on the target region, determining an optimal target modification scheme among the plurality of the target modification schemes, encoding the video signal by using a target region modified according to the optimal target modification scheme, and encoding a target modification index which corresponds to the optimal target modification scheme, wherein the target modification index indicates a target modification scheme which corresponds to a non-modification, a left-right symmetric modification, an up-down symmetric modification, a rotation modification, or a combination thereof.

In the present disclosure, the target modification scheme which corresponds to the target modification index is determined based on an edge distribution, complexity, or rate-distortion cost of the target region.

In the present disclosure, in case of the edge distribution of the target region, when a vertical diagonal edge in the target region is distributed more than or equal to a predetermined threshold value, the target modification scheme corresponds to the left-right symmetric modification or the up-down symmetric modification.

In the present disclosure, in case of the complexity of the target region, when a complexity of a right-side area of the target region is a higher than a left-side area of the target region, the target modification scheme corresponds to the left-right symmetric modification.

In the present disclosure, the target modification index is acquired from the sequence parameter set, a picture parameter set, or a slice header.

The present disclosure provides an apparatus for processing a video signal through a target modification. The apparatus includes a parsing unit for parsing a target modification flag from a sequence parameter set of the video signal, wherein the target modification flag indicates whether a modification is performed on a target region and a post-processing unit for, if the modification is performed on the target region according to the target modification flag, acquiring a target modification index, identifying a target modification scheme which corresponds to the target modification index, and performing an inverse-modification on a reconstructed target region, according to the identified target modification scheme, wherein the target modification index indicates a target modification scheme which corresponds to a non-modification, a left-right symmetric modification, an up-down symmetric modification, a rotation modification, or a combination thereof.

The present disclosure provides an apparatus for processing a video signal through a target modification. The apparatus includes a pre-processing unit for receiving the video signal including a target region, applying a plurality of target modification schemes on the target region, determining an optimal target modification scheme among the plurality of the target modification schemes, and encoding the video signal by using a target region modified according to the optimal target modification scheme and an encoder for encoding a target modification index which corresponds to the optimal target modification scheme, wherein the target modification index indicates a target modification scheme which corresponds to a non-modification, a left-right symmetric modification, an up-down symmetric modification, a rotation modification, or a combination thereof.

MODE FOR INVENTION

Hereinafter, constructions and operations according to embodiments of the present disclosure are described with reference to the accompanying drawings. The constructions and operations of the present disclosure described with reference to the drawings are described as only embodiments, and the technical spirit and the key components and operation of the present disclosure are not restricted by the constructions and operations.

Furthermore, common terms that are now widely used are selected as terms used in the present disclosure, but terms randomly selected by the applicant are used in specific cases. In such a case, a corresponding term should not be interpreted based on only the name of a term used in the description of the present disclosure because the meaning of the corresponding term is clearly described in the detailed description of a corresponding part, but should be interpreted by checking even the meaning of the corresponding term.

Furthermore, terms used in the present disclosure are common terms selected to describe the present disclosure, but may be replaced with other terms for more appropriate analysis if such terms having similar meanings are present. For example, a signal, data, a sample, a picture, a frame, and a block may be properly replaced and interpreted in each coding process. Furthermore, partitioning, decomposition, splitting and division may be properly replaced and interpreted in each coding process.

FIG. 1 is a schematic block diagram of a video signal processing apparatus including an encoder, which is an embodiment to which the present disclosure is applied.

Referring to FIG. 1, the video signal processing apparatus 10 may include a pre-processing unit 101 and an encoder 100. The encoder 100 may be configured to include an video partition unit 110, a transform unit 120, a quantization unit 130, a de-quantization unit 140, an inverse transform unit 150, a filtering unit 160, a decoded picture buffer (DPB) 170, an inter-prediction unit 180, an intra-prediction unit 185 and an entropy encoding unit 190. In FIG. 1, the pre-processing unit 101 and the encoder 100 are described as being separated, but the present disclosure is not limited thereto. The pre-processing unit 101 may be included in the encoder 100.

The pre-processing unit 101 may perform at least one of a left-right symmetric transform, an up-down symmetric transform or a rotation transform on a target region. Furthermore, the pre-processing unit 101 may select an optimal modification scheme through rate-distribution optimization among a plurality of modification or transform methods. Alternatively, in the present disclosure, an optimal modification scheme may be selected through edge distribution analysis. In this case, modification information or transform information of the target region may be transmitted to a decoder. In this case, the target region may include at least one of a sequence, an image, a tile, a picture, a frame, or a block. In the present disclosure, video is basically described for convenience of description, but the present disclosure is not limited thereto, and the video may be substituted.

As described above, the present disclosure can enhance coding efficiency by locating important pixel information of a video at the left and top through the modification and modification information transmission of a target region.

The video partition unit 110 may partition video (or picture or frame), input to the encoder 100, into one or more processing units. In this case, the video input to the encoder 100 may be an image transformed or modified by the pre-processing unit 101. Meanwhile, the processing unit may correspond to at least one of a coding tree unit (CTU), a coding unit (CU), a prediction unit (PU) or a transform unit (TU).

However, the terms are merely used for convenience of description for the present disclosure, and the present disclosure is not limited to the definition of a corresponding term. Furthermore, in the present disclosure, for convenience of description, a video signal is used as a unit used in a process of encoding or decoding a video signal, but the present disclosure is not limited thereto and a video signal may be properly interpreted based on disclosure contents.

The encoder 100 may generate a residual signal by subtracting a prediction signal, output from the inter prediction unit 180 or the intra prediction unit 185, from the input image signal. The generated residual signal is transmitted to the transform unit 120.

The transform unit 120 may generate a transform coefficient by applying a transform scheme to the residual signal. A transform process may be applied to a square pixel block having the same size and may also be applied to a block of a variable size not a square.

The quantization unit 130 may quantize the transform coefficient and transmit it to the entropy encoder 190. The entropy encoder 190 may entropy-code the quantized signal and output it as a bit stream.

The quantized signal output from the quantization unit 130 may be used to generate a prediction signal. For example, the quantized signal may reconstruct a residual signal by applying de-quantization and inverse transform through the de-quantization unit 140 and the inverse transformer 150 within a loop. A reconstructed signal may be generated by adding the reconstructed residual signal to the prediction signal output from the inter prediction unit 180 or the intra prediction unit 185.

Meanwhile, artifacts in which a block boundary is viewed may occur because neighbor blocks are quantized by different quantization parameters in the compression process. Such a phenomenon is called blocking artifacts, which are one of important factors to evaluate picture quality. In order to reduce such artifacts, a filtering process may be performed. Picture quality can be improved by removing blocking artifacts and also reducing an error of a current picture through such a filtering process.

The filtering unit 160 applies filtering to the reconstructed signal and outputs the filtered signal to a playback device or transmits the filtered signal to the decoded picture buffer 170. The filtered signal transmitted to the decoded picture buffer 170 may be used as a reference picture in the inter prediction unit 180. As described above, not only picture quality, but coding efficiency can be improved using the filtered picture as a reference picture in an inter-frame prediction mode.

The decoded picture buffer 170 may store the filtered picture in order to use it as a reference picture in the inter prediction unit 180.

The inter prediction unit 180 performs temporal prediction and/or spatial prediction in order to remove temporal redundancy and/or spatial redundancy with reference to a reconstructed picture. In this case, the reference picture used to perform prediction may include blocking artifacts or ringing artifacts because it is a signal transformed through quantization and de-quantization in a block unit upon coding/decoding before.

Accordingly, the inter prediction unit 180 may interpolate a signal between pixels in a subpixel unit by applying a lowpass filter in order to solve performance degradation attributable to the discontinuity or quantization of a signal. In this case, the subpixel means a virtual pixel generated by applying an interpolation filter, and an integer pixel means an actual pixel present in a reconstructed picture. Linear interpolation, bi-linear interpolation or a Wiener filter may be applied as an interpolation method.

The interpolation filter may be applied to a reconstructed picture to improve the precision of prediction. For example, the inter prediction unit 180 may generate an interpolation pixel by applying the interpolation filter to an integer pixel, and may perform prediction using an interpolated block configured with interpolated pixels as a prediction block.

The intra prediction unit 185 may predict a current block with reference to surrounding samples of a block on which encoding is to be now performed. The intra prediction unit 185 may perform the following process in order to perform intra prediction. First, a reference sample necessary to generate a prediction signal may be prepared. Furthermore, a prediction signal may be generated using the prepared reference sample. Thereafter, a prediction mode is encoded. In this case, the reference sample may be prepared through reference sample padding and/or reference sample filtering. The reference sample may include a quantization error because it has experienced a prediction and reconstruction process. Accordingly, in order to reduce such an error, a reference sample filtering process may be performed on each prediction mode used for intra prediction.

The prediction signal generated through the inter prediction unit 180 or the intra prediction unit 185 may be used to generate a reconstructed signal or may be used to generate a residual signal.

FIG. 2 is a schematic block diagram of a video signal processing apparatus including a decoder, which is an embodiment to which the present disclosure is applied.

Referring to FIG. 2, the video signal processing apparatus 20 may include a decoder 200 and a post-processing unit 270. The decoder 200 may be configured to include a parsing unit (not shown), an entropy decoding unit 210, a de-quantization unit 220, an inverse transform unit 230, a filtering unit 240, a decoded picture buffer (DPB) unit 250, an inter-prediction unit 260 and an intra-prediction unit 265.

In FIG. 2, the decoder 200 and the post-processing unit 270 are described as being separated, but the present disclosure is not limited thereto. The post-processing unit 270 may be included in the decoder 200.

The decoder 200 may receive a signal output by the video signal processing apparatus 10 of FIG. 1. The received signal may be entropy-decoded through the entropy decoding unit 210.

The de-quantization unit 220 acquires a transform coefficient from the entropy-decoded signal using quantization step size information.

The inverse transform unit 230 acquires a residual signal by inverse transforming the transform coefficient.

A reconstructed signal is generated by adding the acquired residual signal to a prediction signal output by the inter-prediction unit 260 or the intra-prediction unit 265.

The filtering unit 240 applies filtering to the reconstructed signal and outputs the filtered signal to a playback device or transmits the filtered signal to the decoding picture buffer unit 250. The filtered signal transmitted to the decoding picture buffer unit 250 may be used as a reference picture in the inter-prediction unit 260.

In the present disclosure, the embodiments described in the transform unit 120 and each function unit of the encoder 100 may also be identically applied to the inverse transform unit 230 and each corresponding function unit of the decoder.

Furthermore, the reconstructed video signal output through the decoder 200 may be post-processed through the post-processing unit 270, and may be played back through a playback device.

The video signal processing apparatus 20 may receive modification information (or transform information). In this case, the modification information may include a modification flag indicating whether to perform an inverse modification (or inverse transform) on output video.

If the inverse modification (or inverse transform) is performed on the output video based on the modification flag, the post-processing unit 270 may perform at least one of a left-right symmetric inverse transform, an up-down symmetric inverse transform, or a rotation inverse transform on the output video.

FIG. 3 is a diagram for describing a division structure of a coding unit, which is an embodiment to which the present disclosure is applied.

The encoder may partition one video (or picture) in a coding tree unit (CTU) unit of a quadrangle form. Furthermore, the encoder sequentially encodes one video by one CTU according to a raster scan order.

One CTU may be decomposed into a quadtree (hereinafter referred to as a "QT") structure and a binarytree (hereinafter referred to as a "BT"). For example, one CTU may be partitioned into 4 units each having a square form and the length of each side reduced by half or may be partitioned into 2 unit each having a rectangular form and a width or height length reduced by half. Such decomposition of a QTBT structure may be recursively performed.

Referring to FIG. 3, the root node of a QT may be related to a CTU. The QT may be split until a QT leaf node is reached. A leaf node of the QT may be split in a BT. The BT may be split until a BT leaf node is reached.

Referring to FIG. 3, a CTU corresponds to the root node, and has the smallest depth (i.e., level 0) value. The CTU may not be split depending on a characteristic of an input video. In this case, the CTU corresponds to a coding unit (CU).

A CTU may be decomposed in a QT form. A QT leaf node may be split in a BT form. As a result, lower nodes having a depth of a level n may be generated. Furthermore, a node (i.e., leaf node) no longer split in a lower node having a depth of a level n corresponds to a coding unit.

Information indicating whether a corresponding CU is split with respect to one CU may be transmitted to the decoder. For example, the information may be defined as a split flag, and may be represented as a syntax element "split_cu_flag." Furthermore, information indicating whether a QT leaf node is split into a BT is performed may be transmitted to the decoder. For example, the information may be defined as a BT split flag, and may be represented as a syntax element "split_bt_flag."

Furthermore, if a QT leaf node is split into a BT based on "split_bt_flag", a BT split form may be transmitted to the decoder so that the QT leaf node is split in a rectangle form having a width of a half size or a rectangular form having a height of a half size. For example, the information may be defined as a BT split mode, and may be represented as a syntax element "bt_split_mode."

FIG. 4 is a diagram for describing prediction directions according to intra prediction modes, which is an embodiment to which the present disclosure is applied.

FIG. 4(a) illustrates prediction directions according to 35 intra prediction modes, and FIG. 4(b) illustrates prediction directions according to 67 intra prediction modes.

In intra prediction, prediction modes may have prediction directions for the location of a reference sample used for prediction. In the present disclosure, an intra prediction mode having a prediction direction is called an intra directivity prediction mode (Intra_Angular prediction mode) or an intra directivity mode. In contrast, an intra prediction mode not having a prediction direction includes an intra planar (INTRA_PLANAR) prediction mode and an intra DC (INTRA_DC) prediction mode.

In intra prediction, prediction is performed on a current processing block based on a derived prediction mode. A reference sample used for prediction and a detailed prediction method are different depending on a prediction mode. If a current block is encoded based on an intra prediction mode, the decoder may derive a prediction mode of a current block in order to perform prediction.

The decoder may identify whether neighboring samples of a current processing block can be used for prediction, and may configure reference samples to be used for prediction.

In intra prediction, neighboring samples of a current processing block mean a sample neighboring the left boundary of a current processing block of an nS×nS size and a total of 2×nS samples neighboring the bottom-left of the current processing block, a sample neighboring the top boundary of the current processing block and a total of 2×nS samples neighboring the top-right of the current processing block, and one sample neighboring the top-left of the current processing block.

However, some of neighboring samples of a current processing block have not yet been decoded or may not be available. In this case, the decoder may configure reference samples to be used for prediction by substituting samples that are not available as available samples.

The decoder may perform the filtering of a reference sample based on an intra prediction mode.

The decoder may generate a prediction block for a current processing block based on an intra prediction mode and reference samples. That is, the decoder may generate a prediction block for a current processing block based on an intra prediction mode, derived in an intra prediction mode deriving step, and reference samples acquired through a reference sample configuration step and a reference sample filtering step.

Referring to FIG. 4(b), for intra encoding and more accurate prediction of high resolution video, 35 types of directivity modes are expanded to 67 types of directivity modes. In FIG. 4(b), arrows indicated by dotted lines indicate 32 types of directivity modes added in FIG. 4(a). An intra planar (INTRA_PLANAR) mode and an intra DC (INTRA_DC) mode are the same as the existing intra planar mode and intra DC mode. All of the added 32 types of directivity modes are applied in a block size, and may be applied in intra encoding of a luma component and a chroma component.

The name of each mode may be defined as follows.

TABLE 1

| Intra prediction mode | Associated Name |
| --- | --- |
| 0 | intra planar (INTRA_PLANAR) |
| 1 | intra DC (INTRA_DC) |
| 2 66 | intra directivity 2 intra directivity 66 (INTRA_ANGULAR2 INTRA_ANGULAR66) |

FIG. 5 is a diagram for describing a process of processing a video signal through the modification of a target region, which is an embodiment to which the present disclosure is applied.

In current video coding, encoding is performed in a block unit from the top left of a video in a raster scan order. Accordingly, in intra-frame encoding, prediction is performed with reference to only pixel information of the left and top of a block. Accordingly, if important pixel information (e.g., edge) is much at the right or bottom of the block, there is a problem in that prediction efficiency is reduced.

The present disclosure proposes a method of improving coding efficiency by locating important pixel information of a video at the left and top through the modification (or transform) and modification information (or transform information) transmission of a target region as in FIG. 5. In this case, the target region may include at least one of a sequence, an image, a tile, a picture, a frame or a block. In the present disclosure, video may be basically described for convenience of description, but the present disclosure is not limited thereto. Video may be substituted.

A term "modification" used in the present disclosure may be substituted with a transform. However, the term "modification" is used in order to avoid confusion between the term and a transform, such as a discrete cosine transform (DCT).

Referring to FIG. 5, when a target video is input, the video signal processing apparatus may determine whether to perform a modification on the target video. Furthermore, the video signal processing apparatus may determine which modification scheme is an optimal modification scheme.

The video signal processing apparatus may signal a target modification flag indicating whether to perform a modification on the target video, and may signal a target modification index indicating an optimal target modification scheme. In this case, the target modification flag and/or the target modification index may be referred to as "target modification information."

Meanwhile, the video signal processing apparatus may reconstruct the modified video based on a target modification flag, and may reconstruct the video by performing an inverse modification based on a target modification scheme corresponding to the target modification index.

FIG. 6 is a schematic block diagram of the pre-processing unit for modifying a target region, which is an embodiment to which the present disclosure is applied.

The pre-processing unit 101 to which the present disclosure is applied may include a target region modification determination unit 102 and a target region modification unit 103.

The target region modification determination unit 102 may determine whether to perform a modification on a target region, and may determine which target modification scheme will be used.

The target region modification unit 103 may perform a modification on the target region based on the determined target modification scheme.

In an embodiment, examples of the target modification scheme may include methods, such as Table 2 below.

TABLE 2

| Index | Target modification scheme |
| --- | --- |
| 0 | left-right symmetric transform |
| 1 | up-down symmetric transform |
| 2 | left/right/up-down symmetric transform |

TABLE 2-continued

| Index | Target modification scheme |
|---|---|
| 3 | rotation transform |
| 4 | left-right symmetric and rotation transform |
| 5 | up-down symmetric and rotation transform |

Table 2 is merely an embodiment, and a combination of the methods may be possible in addition to each of the methods.

For example, if (1) a left-right symmetric transform, (2) an up-down symmetric transform, (3) a left/right/up-down symmetric transform, (4) a rotation transform, (5) a left-right symmetric and rotation transform, and (6) an up-down symmetric and rotation transform are represented into equations, they may be represented into Equation 1 to Equation 6, respectively.

$$trans(x, y) = org(x, W - 1 - y) \quad \text{[Equation 1]}$$

$$trans(x, y) = org(H - 1 - x, y) \quad \text{[Equation 2]}$$

$$trans(x, y) = org(H - 1 - x, W - 1 - y) \quad \text{[Equation 3]}$$

$$trans(x, y) = R * org(x, y), R = \begin{bmatrix} \cos\theta & -\sin\theta \\ \sin\theta & \cos\theta \end{bmatrix} \quad \text{[Equation 4]}$$

$$trans(x, y) = R * org(x, W - 1 - y), R = \begin{bmatrix} \cos\theta & -\sin\theta \\ \sin\theta & \cos\theta \end{bmatrix} \quad \text{[Equation 5]}$$

$$trans(x, y) = R * org(H - 1 - x, y), R = \begin{bmatrix} \cos\theta & -\sin\theta \\ \sin\theta & \cos\theta \end{bmatrix} \quad \text{[Equation 6]}$$

In this case, (x, y) indicates a pixel location, W indicates the width of a target region, and H indicates the height of the target region. org means the original target region, and trans means a modified target region. R means a matrix on which a rotation transform is performed. θ means a rotation angle.

In Equation 4, the rotation angle may be 90 degrees, 180 degrees or 270 degrees, but the present disclosure is not limited thereto. More various combinations may be generated based on a rotation angle.

In another embodiment, the video signal processing apparatus may determine or select an optimal target modification scheme among a plurality of the target modification schemes.

For example, the optimal target modification scheme may be determined based on an edge distribution, complexity, or rate-distortion cost of the target region.

First, in the case of an edge distribution of a target region, the target region may be modified in the direction in which a vertical diagonal edge of the target region may be reduced. In this case, the vertical diagonal edge may mean a pre-horizontal mode direction and a post-vertical mode direction among intra prediction modes.

For example, if vertical diagonal edges within the target region are many, a left-right symmetric transform or an up-down symmetric transform may be performed. That is, when vertical diagonal edges within the target region are distributed at a predetermined threshold or more, the optimal target modification scheme may indicate a left-right symmetric transform or an up-down symmetric transform. In this case, edge distribution analysis may be calculated using various edge detection filters and algorithms for the target region.

Furthermore, in the complexity of a target region, the target region may be modified in the direction in which complexity may be increased at the top left of the target region. For example, when a right region within a target region has greater complexity than a left region, the optimal target modification scheme may indicate a left-right symmetric transform. In this case, the complexity of the target region may be calculated by comparing high frequency components for each target region or using an algorithm, such as object detection.

Furthermore, in the case of the rate-distortion cost of a target region, an optimal target modification scheme may be determined through rate-distortion optimization (RDO) for the target region. In this case, a method, such as a video size reduction through the down sampling of the original image, simple RDO execution (e.g., the $1^{st}$ RDO step for intra prediction mode candidate selection), the no use of a complicated coding tool, a QT and BT depth limit, may be used for the RDO.

Meanwhile, binarization for a target modification scheme may be performed like Table 3 to Table 6 below. However, this is merely an example, and binarization may be modified based on a combination of target modification schemes.

TABLE 3

| Target modification scheme | Binarization |
|---|---|
| Input image transform off | 000 |
| Left-right symmetric transform | 001 |
| Up-down symmetric transform | 010 |
| 90-degrees rotation | 011 |
| 180-degrees rotation | 100 |
| 270-degrees rotation | 101 |
| Left-right symmetric and 90-degrees rotation | 110 |
| Up-down symmetric and 90-degrees rotation | 111 |

TABLE 4

| Target modification scheme | Binarization |
|---|---|
| Input image transform off | 00 |
| Left-right symmetric transform | 01 |
| Up-down symmetric transform | 10 |
| 180-degrees rotation | 11 |

TABLE 5

| Target modification scheme | Binarization |
|---|---|
| Input image transform off | 0 |
| Up-down symmetric transform | 10 |
| 180-degrees rotation | 11 |

TABLE 6

| Target modification scheme | Binarization |
|---|---|
| Input image transform off | 0 |
| Left-right symmetric transform | 1 |

In another embodiment, information on a target modification scheme may transmit as at least one unit of a sequence, a tile, picture, a frame, a slice or a block. Binarization information may be transmitted through context modeling. For example, Table 7 and Table 9 show that context modeling per bit is applied if binarization information is transmitted in a block or tile unit.

Binarization information is transmitted in a block unit (CTU or CU) or tile unit, and may be transmitted through context modeling. Table 7 to Table 9 show examples in which context modeling per bit is applied.

Table 7 and Table 8 are context modeling examples corresponding to Table 5. Table 9 shows a context modeling example corresponding to Table 6.

TABLE 7

| Transform method | Context model 1 | Context model 2 |
|---|---|---|
| Non-modification | 0 | |
| Up-down symmetric transform | 1 | 0 |
| 180-degrees rotation | 1 | 1 |

TABLE 8

| Transform method | Context model 1, 2, 3 | Context model 4 |
|---|---|---|
| Non-modification | 0 | |
| Up-down symmetric transform | 1 | 0 |
| 180-degrees rotation | 1 | 1 |

TABLE 9

| Transform method | Context model 1, 2, 3 |
|---|---|
| Non-modification | 0 |
| Left-right symmetric transform | 1 |

If three types of context modeling are applied to one binarization as in Table 8 and Table 9, context modeling may be configured like Table 10.

TABLE 10

| Case | Context model number |
|---|---|
| If both the binarizations of an upper block (or tile) and left block (or tile) of a current block (or tile) are 0 | 0 |
| If both the binarizations of an upper block (or tile) and left block (or tile) of a current block (or tile) are 1 | 2 |
| In other cases | 1 |

FIG. 7 is a schematic block diagram of the post-processing unit for performing an inverse modification on a target region, which is an embodiment to which the present disclosure is applied.

The post-processing unit 270 to which the present disclosure is applied may include a target region inverse-modification determination unit 271 and a target region inverse-modification unit 272.

The target region inverse-modification determination unit 271 may determine whether to perform an inverse modification on a target region, and may identify which target modification scheme has been used. In this case, all the embodiments described in FIG. 6 may be applied, and a redundant description thereof is omitted.

The target region inverse-modification unit 272 may perform a modification on the target region based on the identified target modification scheme. In this case, all the embodiments described in FIG. 6 may be applied, and a redundant description thereof is omitted.

FIG. 8 is a flowchart illustrating a process of processing a video signal through the modification of a target region, which is an embodiment to which the present disclosure is applied.

The video signal processing apparatus may receive a video signal including a target region (S810).

Furthermore, the video signal processing apparatus may determine whether to modify the target region (S820).

If it is determined to modify the target region, the video signal processing apparatus may perform a modification on the target region (S830).

In this case, the video signal processing apparatus may encode target modification information and the modified target region (S840). For example, the target modification information may include a target modification index. The target modification index indicates a target modification scheme, and may correspond to at least one of a non-modification, a left-right symmetric transform, an up-down symmetric transform, a rotation transform or a combination of them.

However, if it is determined that a modification is not performed on the target region, the video signal processing apparatus may encode the target region without a modification (S850).

Furthermore, even in the case of the present embodiment, all the various embodiments described in the present disclosure may be applied.

FIG. 9 is a flowchart illustrating a process of processing a video signal through an inverse modification of a target region, which is an embodiment to which the present disclosure is applied.

The video signal processing apparatus may receive a bit stream including a target region, and may decode the bit stream (S910).

Furthermore, the video signal processing apparatus may determine whether to perform an inverse modification on the target region based on a target modification flag (S920). In this case, the target modification flag indicates whether a modification is performed on the target region.

If it is determined to perform an inverse modification on the target region, the video signal processing apparatus may decode target modification information (S930), and may perform an inverse modification on the target region based on the decoded target modification information (S940).

For example, the target modification information may include a target modification index. The target modification index indicates a target modification scheme, and may correspond to at least one of a non-modification, a left-right symmetric transform, an up-down symmetric transform, a rotation transform or a combination of them.

However, if it is determined that an inverse modification is not performed on the target region, the video signal processing apparatus decodes the target region without an inverse modification.

Furthermore, even in the case of the present embodiment, all the various embodiments described in the present disclosure may be applied.

FIGS. 10 to 15 show syntax structures that define target modification information, which are embodiments to which the present disclosure is applied.

FIG. 10 shows a syntax structure that defines target modification information (sps_seq_transform_id) in a sequence parameter set (SPS) level. The target modification information may include a target modification index.

For example, the target modification index indicates a target modification scheme in the SPS level, and may correspond to at least one of a non-modification, a left-right symmetric transform, an up-down symmetric transform or a rotation transform or a combination of them.

The target modification index may be defined as sps_seq_transform_id (S1010), and the target modification index may be defined like Table 2. In this case, Table 2 is merely an embodiment, and the present disclosure is not limited thereto. A combination of various embodiments described in the present disclosure is possible.

FIG. 11 shows a syntax structure that defines target modification information in a sequence parameter set (SPS) level. The target modification information may include a target modification flag and a target modification index.

In this case, the target modification flag indicates whether to perform a modification on a target region, and may be represented as sps_seq_transform_flag (S1110).

Furthermore, the target modification index indicates a target modification scheme, and may correspond to at least one of a non-modification, a left-right symmetric transform, an up-down symmetric transform or a rotation transform or a combination of them. For example, the target modification index may be represented as sps_seq_transform_id.

The target modification index may be acquired (S1130) based on the target modification flag (S1120). For example, the target modification index may be acquired only if a modification is performed on a target region based on the target modification flag.

FIG. 12 shows a syntax structure that defines target modification information in a picture parameter set (PPS) level. The target modification information may include a target modification index.

For example, the target modification index indicates a target modification scheme in a picture level, and may correspond to at least one of a non-modification, a left-right symmetric transform, an up-down symmetric transform or a rotation transform or a combination of them.

The target modification index may be defined as pps_seq_transform_id (S1210). The target modification index may be defined like Table 2. In this case, Table 2 is merely an embodiment, and the present disclosure is not limited thereto. A combination of various embodiments described in the present disclosure is possible.

FIG. 13 shows a syntax structure that defines target modification information in a picture parameter set (PPS) level. The target modification information may include a target modification flag.

In this case, the target modification flag indicates whether to perform a modification on a target region in a picture level, and may be represented as pps_seq_transform_flag (S1310).

The present disclosure is not limited thereto, and a combination of various embodiments described in the present disclosure is possible.

FIG. 14 shows a syntax structure that defines target modification information in a slice header. The target modification information may include a target modification index.

For example, the target modification index indicates a target modification scheme in a slice segment header level, and may correspond to at least one of a non-modification, a left-right symmetric transform, an up-down symmetric transform or a rotation transform or a combination of them.

The target modification index may be defined as slice_seq_transform_id (S1410). The target modification index may be defined like Table 2. In this case, Table 2 is merely an embodiment, and the present disclosure is not limited thereto. A combination of various embodiments described in the present disclosure is possible.

FIG. 15 shows a syntax structure that defines target modification information (sps_seq_transform_flag and sps_seq_transform_id) in a sequence parameter set (SPS) and a slice header.

For example, the target modification information may include a target modification flag and a target modification index.

The target modification flag may be defined in an SPS, and the target modification index may be defined in a slice segment header. In this case, the target modification flag may be represented as seq_transform_flag, and the target modification index may be represented as seq_transform_id.

Accordingly, the video signal processing apparatus may acquire a target modification flag in an SPS (S1510), and may acquire a target modification index from a slice segment header (S1530) based on the target modification flag (S1520). For example, the target modification index may be acquired only if a modification is performed on a target region based on the target modification flag.

In an embodiment, after the decoder terminates decoding in a sequence or frame unit, it may modify decoded video based on a received target modification scheme. For example, if pps_seq_transform_id of a PPS is 1, a left-right symmetric transform may be performed on a decoded video. However, this is merely an embodiment, and the present disclosure is not limited thereto. A combination of various embodiments described in the present disclosure is possible.

FIG. 16 is a flowchart for describing a process of modifying a target region, which is an embodiment to which the present disclosure is applied.

The video signal processing apparatus may receive a video signal including a target region (S1610).

The video signal processing apparatus may apply a plurality of target modification schemes on the target region (S1620).

The video signal processing apparatus may determine an optimal target modification scheme among the plurality of target modification schemes (S1630). In this case, the optimal target modification scheme is determined based on an edge distribution, complexity or rate-distortion cost of the target region.

Furthermore, the video signal processing apparatus may encode the video signal using the target region modified based on the optimal target modification scheme (S1640).

Meanwhile, the video signal processing apparatus may encode a target modification index corresponding to the optimal target modification scheme (S1650). The target modification index indicates a target modification scheme, and may correspond to at least one of a non-modification, a left-right symmetric transform, an up-down symmetric transform or a rotation transform or a combination of them, for example.

The present disclosure is not limited thereto, and various embodiments described in the present disclosure may be applied.

FIG. 17 is a flowchart for describing a process of inversely modifying a target region, which is an embodiment to which the present disclosure is applied.

The video signal processing apparatus may acquire a target modification flag from a sequence parameter set of a video signal (S1710). In this case, the target modification flag indicates whether to perform a modification on a target region. For example, the target region may correspond to at least one of a sequence, an image, a frame, a tile or a block.

The video signal processing apparatus may acquire a target modification index (S1730) if a modification is performed on a target region based on the target modification flag (S1720). In this case, the target modification index indicates a target modification scheme, and corresponds to at least one of a non-modification, a left-right symmetric transform, an up-down symmetric transform or a rotation transform or a combination of them.

Furthermore, the target modification index may be acquired from the sequence parameter set, picture parameter set or slice header.

The video signal processing apparatus may identify a target modification scheme corresponding to the target modification index (S1740). In this case, the target modification scheme corresponding to the target modification index is determined based on an edge distribution, complexity or rate-distortion cost of the target region.

The video signal processing apparatus may perform an inverse modification on a reconstructed target region based on the target modification scheme (S1750).

Furthermore, the video signal processing apparatus may output or display the inversely modified target region.

The present disclosure is not limited thereto, and various embodiments described in the present disclosure may be applied.

FIG. 18 shows the structure of a content streaming system, which is an embodiment to which the present disclosure is applied.

Referring to FIG. 18, the content streaming system to which the present disclosure is applied may basically include an encoding server, a streaming server, a web server, a media storage, a user equipment and a multimedia input device.

The encoding server functions to generate a bit stream by compressing content received from multimedia input devices, such as a smartphone, a camera, and a camcorder, into digital data, and to transmit the digital data to the streaming server. For another example, if multimedia input devices, such as a smartphone, a camera, and a camcorder, directly generate a bit stream, the encoding server may be omitted.

The bit stream may be generated by an encoding method or bit stream generation method to which the present disclosure is applied. The streaming server may temporarily store the bit stream in a process of transmitting or receiving the bit stream.

The streaming server transmits multimedia data to the user equipment based on a user request through the web server. The web server plays a role of a medium for notifying a user that which service is present. When the user requests a desired service from the web server, the web server transmits the desired service to the streaming server. The streaming server transmits multimedia data to the user. In this case, the content streaming system may include a separate control server. In this case, the control server functions to control an instruction/response between devices within the content streaming system.

The streaming server may receive content from the media storage and/or the encoding server. For example, if content is received from the encoding server, the streaming server may receive the content in real time. In this case, in order to provide a smooth streaming service, the streaming server may store the bit stream for a given time.

Examples of the user equipment may include a mobile phone, a smartphone, a laptop computer, a terminal for digital broadcasting, a personal digital assistants (PDA), a portable multimedia player (PMP), a navigator, a slate PC, a tablet PC, an ultrabook, a wearable device, (e.g., a watch type terminal (smart watch), a glass type terminal (smart glass), and a head mounted display (HMD)), digital TV, a desktop computer, and a digital signage.

Each of the servers within the content streaming system may operate as a distributed server. In this case, data received from the servers may be distributed and processed.

As described above, the embodiments described in the present disclosure may be implemented and performed on a processor, a micro processor, a controller or a chip. For example, the function units shown in each of drawings may be implemented and performed on a computer, a processor, a micro processor, a controller or a chip.

Furthermore, the decoder and the encoder to which the present disclosure is applied may be included in a multimedia broadcasting transmission and reception device, a mobile communication terminal, a home cinema video device, a digital cinema video device, a camera for monitoring, a video dialogue device, a real-time communication device such as video communication, a mobile streaming device, a storage medium, a camcorder, a video on-demand (VoD) service provision device, over the top (OTT) video device, an Internet streaming service provision device, a three-dimensional (3D) video device, a video telephony device, and a medical video device, and may be used to process a video signal or a data signal. For example, over the top (OTT) video device may comprise a game console, a blu-ray player, Internet access TV, home theater system, smartphone, tablet PC, digital video recorder (DVR).

Furthermore, the processing method to which the present disclosure is applied may be produced in the form of a program executed by a computer, and may be stored in a computer-readable recording medium. Multimedia data having a data structure according to the present disclosure may also be stored in a computer-readable recording medium. The computer-readable recording medium includes all types of storage devices and distribution storage devices in which computer-readable data is stored. The computer-readable recording medium may include a Blueray disk (BD), a universal serial bus (USB), a ROM, a PROM, an EPROM, an EEPROM, a RAM, a CD-ROM, a magnetic tape, a floppy disk, and an optical data storage device, for example. Furthermore, the computer-readable recording medium includes media implemented in the form of carriers (e.g., transmission through the Internet). Furthermore, a bit stream generated using an encoding method may be stored in a computer-readable recording medium or may be transmitted over wired and wireless communication networks.

Furthermore, the embodiment of the present disclosure may be implemented as a computer program product based on program code. The program code may be performed in a computer according to the embodiment of the present disclosure. The program code may be stored on a computer-readable carrier.

INDUSTRIAL APPLICABILITY

The above-described preferred embodiments of the present disclosure have been disclosed for illustrative purposes, and those skilled in the art may improve, change, substitute, or add various other embodiments without departing from the technical spirit and scope of the present disclosure disclosed in the attached claims.

The invention claimed is:
1. A method for processing a video signal through a target modification by an apparatus, comprising:
obtaining a target modification flag from a sequence parameter set of the video signal, wherein the target modification flag indicates whether a modification is performed on a target region;

based on that the modification is performed on the target region based on the target modification flag, obtaining a target modification index, wherein the target modification index indicates a target modification scheme which corresponds to a left-right symmetric modification, an up-down symmetric modification, a rotation modification, or a combination thereof to locate specific pixel information within a left/top region in the target region;

identifying the target modification scheme which corresponds to the target modification index, wherein the target modification scheme is determined based on an edge distribution, complexity, or rate-distortion cost of the target region, wherein, based on that a complexity of a right-side area in the target region is higher than a left-side area in the target region, the target modification scheme corresponds to the left-right symmetric modification, and wherein, based on that a number of a top-right diagonal prediction mode or a bottom-left diagonal prediction mode in the target region is more than or equal to a predetermined threshold value, the target modification scheme corresponds to the left-right symmetric modification or the up-down symmetric modification; and performing an inverse-modification on a reconstructed target region, based on the identified target modification scheme.

2. The method of claim 1,
wherein the target region corresponds to at least one of a sequence, an image, a frame, a tile, or a block.

3. The method of claim 1,
wherein the target modification index is acquired from the sequence parameter set, a picture parameter set, or a slice header.

4. A method for processing a video signal through a target modification by an apparatus, comprising:
receiving the video signal including a target region;
applying a plurality of target modification schemes on the target region;
determining an optimal target modification scheme among the plurality of the target modification schemes;
encoding the video signal by using a target region modified based on the optimal target modification scheme; and
encoding a target modification index which corresponds to the optimal target modification scheme,
wherein the target modification index indicates a target modification scheme which corresponds to a left-right symmetric modification, an up-down symmetric modification, a rotation modification, or a combination thereof, to locate specific pixel information within a left/top region in the target region,
wherein the target modification scheme is determined based on an edge distribution, complexity, or rate-distortion cost of the target region,
wherein, based on that a complexity of a right-side area in the target region is higher than a left-side area in the target region, the target modification scheme corresponds to the left-right symmetric modification, and
wherein, based on that a number of a top-right diagonal prediction mode or a bottom-left diagonal prediction mode in the target region is more than or equal to a predetermined threshold value, the target modification scheme corresponds to the left-right symmetric modification or the up-down symmetric modification.

5. The method of claim 4,
wherein the target region corresponds to at least one of a sequence, an image, a frame, a tile, or a block.

6. The method of claim 4,
wherein the target modification index is acquired from the sequence parameter set, a picture parameter set, or a slice header.

7. An apparatus for processing a video signal through a target modification, comprising:
a processor configured to parse a target modification flag from a sequence parameter set of the video signal, wherein the target modification flag indicates whether a modification is performed on a target region; and
based on that the modification is performed on the target region based on the target modification flag, obtain a target modification index,
identify a target modification scheme which corresponds to the target modification index,
wherein the target modification index indicates a target modification scheme which corresponds to a left-right symmetric modification, an up-down symmetric modification, a rotation modification, or a combination thereof to locate specific pixel information within a left/top region in the target region,
wherein the target modification scheme is determined based on an edge distribution, complexity, or rate-distortion cost of the target region,
wherein, based on that a complexity of a right-side area in the target region is higher than a left-side area in the target region, the target modification scheme corresponds to the left-right symmetric modification, and
wherein, based on that a number of a top-right diagonal prediction mode or a bottom-left diagonal prediction mode in the target region is more than or equal to a predetermined threshold value, the target modification scheme corresponds to the left-right symmetric modification or the up-down symmetric modification, and
perform an inverse-modification on a reconstructed target region, based on the identified target modification scheme.

8. An apparatus for processing a video signal through a target modification, comprising:
a processor configured to receive the video signal including a target region, applying a plurality of target modification schemes on the target region,
determine an optimal target modification scheme among the plurality of the target modification schemes, and
encode the video signal by using a target region modified based on the optimal target modification scheme; and
encode a target modification index which corresponds to the optimal target modification scheme,
wherein the target modification index indicates a target modification scheme which corresponds to a left-right symmetric modification, an up-down symmetric modification, a rotation modification, or a combination thereof, to locate specific pixel information within a left/top region in the target region,
wherein the target modification scheme is determined based on an edge distribution, complexity, or rate-distortion cost of the target region,
wherein, based on that a complexity of a right-side area in the target region is higher than a left-side area in the target region, the target modification scheme corresponds to the left-right symmetric modification, and
wherein, based on that a number of a top-right diagonal prediction mode or a bottom-left diagonal prediction mode in the target region is more than or equal to a predetermined threshold value, the target modification scheme corresponds to the left-right symmetric modification or the up-down symmetric modification.

\* \* \* \* \*